US009880636B2

(12) United States Patent
Liu et al.

(10) Patent No.: US 9,880,636 B2
(45) Date of Patent: Jan. 30, 2018

(54) CONFIGURABLE CHARACTER VARIANT UNIFICATION

(71) Applicant: International Business Machines Corporation, Armonk, NY (US)

(72) Inventors: Su Liu, Austin, TX (US); K. Rene' Staff, Austin, TX (US); Cheng Xu, Beijing (CN); Shunguo Yan, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 100 days.

(21) Appl. No.: 14/466,365

(22) Filed: Aug. 22, 2014

(65) Prior Publication Data

US 2016/0042059 A1  Feb. 11, 2016

Related U.S. Application Data

(63) Continuation of application No. 14/453,050, filed on Aug. 6, 2014.

(51) Int. Cl.
*G06F 3/01* (2006.01)
*G06F 17/30* (2006.01)
(Continued)

(52) U.S. Cl.
CPC ............ *G06F 3/018* (2013.01); *G06F 3/0233* (2013.01); *G06F 3/04842* (2013.01); *G06F 17/30684* (2013.01)

(58) Field of Classification Search
CPC ........ G06F 3/018; G06F 3/0233; G06F 17/27; G06F 17/273; G06F 17/2735; G06F 17/276
(Continued)

(56) References Cited

U.S. PATENT DOCUMENTS 7,257,528 B1 * 8/2007 Ritchie ................. G06F 3/0236
341/28
8,472,719 B2   6/2013 Tuganbaev et al.
(Continued)

FOREIGN PATENT DOCUMENTS

JP       2005346537 A     12/2005

OTHER PUBLICATIONS

Cook, Variant Issues and Solutions, UniHan Variation: Issues and Solutions, 23rd Internationalization and Unicode Conference (IUC23) Unicode, Internationalization and the Web: The Global Connection, Mar. 24-26, 2003, Prague, Czech Republic, http://www.unicode.org/iuc/iuc23/.

*Primary Examiner* — Omar Casillashernandez
(74) *Attorney, Agent, or Firm* — Garg Law Firm, PLLC; Rakesh Garg; Noah Sharkan

(57) ABSTRACT

A method for configurable character variant unification is provided in the illustrative embodiments. A determination is made that a unification profile is applicable to a circumstance in which a character variant has been selected. The character variant is a variation of a character in a set of variations of the character such that each variation of the character in the set is represented by a unique Unicode code point. A unification repository is identified according to the profile. A determination is made whether the character variant satisfies a unification rule. Responsive to the character variant not satisfying the unification rule, a different variation of the character is selected from the unification repository, the different variation forming a replacement character variant. The replacement character variant is used in place of the character variant.

15 Claims, 6 Drawing Sheets

(51) Int. Cl.
*G06F 3/023* (2006.01)
*G06F 3/0484* (2013.01)
*G06F 3/02* (2006.01)

(58) Field of Classification Search
USPC .......................................................... 341/28
See application file for complete search history.

(56) References Cited

U.S. PATENT DOCUMENTS

| | | | | |
|---|---|---|---|---|
| 2003/0202832 A1* | 10/2003 | Lorenzo | ................ | G06F 3/0233 400/103 |
| 2004/0125152 A1* | 7/2004 | Sommers | .............. | G06F 3/0236 715/856 |
| 2004/0239534 A1* | 12/2004 | Kushler | .................. | G06F 3/018 341/28 |
| 2006/0010109 A1* | 1/2006 | Harrity | .................. | G06F 17/273 |
| 2006/0230350 A1* | 10/2006 | Baluja | .................... | G06F 3/0237 715/700 |
| 2009/0174580 A1* | 7/2009 | Fux | ....................... | G06F 3/0237 341/22 |
| 2009/0179778 A1* | 7/2009 | Molla | ................... | G06F 3/0235 341/22 |
| 2012/0124067 A1* | 5/2012 | Liu | ...................... | G06Q 10/105 707/758 |
| 2013/0027406 A1* | 1/2013 | Liu | ....................... | G06F 17/214 345/467 |
| 2013/0046544 A1* | 2/2013 | Kay | .................... | G06F 3/04883 704/275 |
| 2013/0110503 A1 | 5/2013 | Scott | | |
| 2014/0052436 A1 | 2/2014 | Qian et al. | | |
| 2015/0040058 A1* | 2/2015 | Zhang | ................... | G06F 3/0236 715/780 |

\* cited by examiner

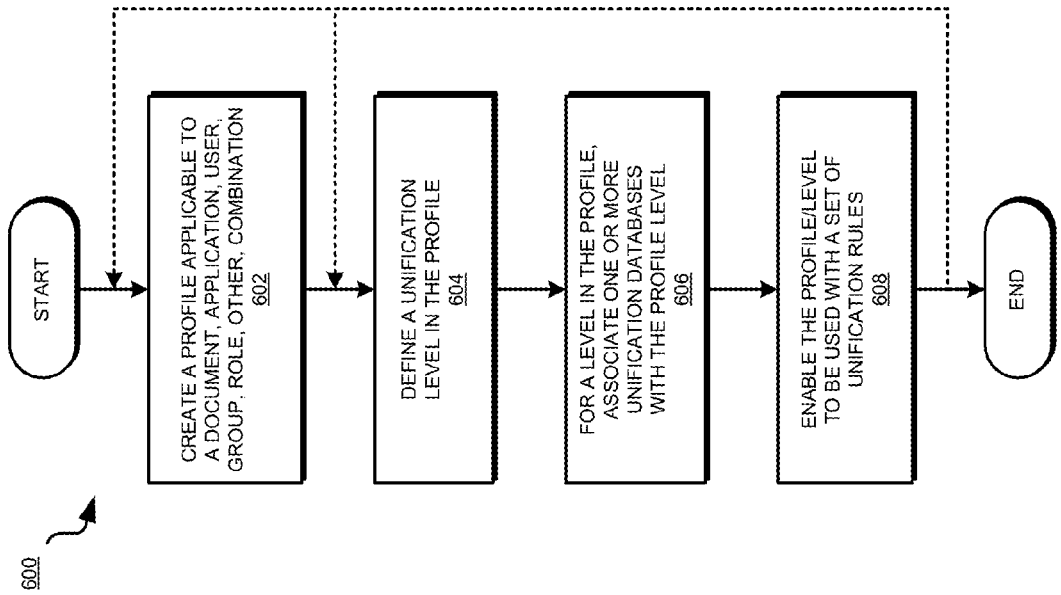

CONFIGURABLE CHARACTER VARIANT UNIFICATION

The present application is a continuation application of, and claims priority to, a U.S. patent application of the same title, Ser. No. 14/453,050, which was filed on Aug. 6, 2014, assigned to the same assignee, and incorporated herein by reference in its entirety.

TECHNICAL FIELD

The present invention relates generally to a method for providing consistent computer input in multiple languages. More particularly, the present invention relates to a method for configurable unification of character variants received from data input.

BACKGROUND

There are alphabet and non-alphabet languages in the world. For example, Chinese, Japanese and Korean borrowed alphabetic elements to represent their own phonetic symbols or strokes.

A computer keyboard is a common device for providing a computer input. A keyboard is language-specific such that the alphabet or non-alphabet keys available on the keyboard can be pressed to directly input only those characters or symbols in the keyboard's language that are assigned to those keys. For inputting other characters or symbols in the language, a user may need to press a combination of keys on the keyboard to invoke a specific input method application for the language.

Many languages have sets of characters or symbols (e.g., character alphabet in English, or phonetic or stroke alphabet in other languages) that are too large to accommodate on a keyboard. Many languages need other ways of mapping the keyboard keys to the characters or symbols in the language's set of characters or symbols. Using the keyboard keys according to the mapping produces the mapped characters or symbols in the language. Furthermore, the phonetic or stroke alphabets of many languages do not use characters to form words in the manner of the English language, but have a single character or collection of characters that represent words. Thus, providing computer input in many languages is not as simple as pressing the letter-keys on the keyboard but an indirect process of pressing a combination of keys to generate characters not available as keys on the keyboard.

Unicode is a method of coding characters of multiple languages. A Unicode table comprises unique codes called code points assigned to characters of one or more languages. A code point comprises an alphanumeric representation that can be generated on commonly used keyboard configurations, such as an English language QWERTY keyboard.

To enter a code point, the user generally supplies an indication that the alphanumeric string following the indication is a Unicode code point as is to be translated using a Unicode table to generate a character. For example, using a QWERTY keyboard, the user presses the ALT key, keeps the ALT key depressed while entering the code point, and releases the ALT key when the code point entry is complete.

An application called a Unicode input method application (hereinafter, "input method", or "UIM") intercepts the Unicode code point that the user enters. A Unicode editor is an example UIM. The UIM looks up a Unicode table to find the character that matches the code point that the user entered. The UIM supplies the character to a target application to which the user is supplying the input.

Different sections in a Unicode table comprise different unique sets of unique code points to represent different sets of characters in different languages. In other words, a code point in all of Unicode is unique to a specific character in a specific language.

SUMMARY

The illustrative embodiments provide a method, for configurable character variant unification. An embodiment includes a method for configurable character variant unification. The embodiment determines that a unification profile is applicable to a circumstance in which a character variant has been selected, wherein the character variant is a variation of a character in a set of variations of the character such that each variation of the character in the set is represented by a unique Unicode code point. The embodiment identifies a unification repository according to the profile. The embodiment determines whether the character variant satisfies a unification rule. The embodiment selects, responsive to the character variant not satisfying the unification rule, a different variation of the character from the unification repository, the different variation forming a replacement character variant. The embodiment uses the replacement character variant in place of the character variant.

Another embodiment includes a computer usable program product comprising a computer readable storage device including computer usable code for configurable character variant unification. The embodiment further includes computer usable code for determining that a unification profile is applicable to a circumstance in which a character variant has been selected, wherein the character variant is a variation of a character in a set of variations of the character such that each variation of the character in the set is represented by a unique Unicode code point. The embodiment further includes computer usable code for identifying a unification repository according to the profile. The embodiment further includes computer usable code for determining whether the character variant satisfies a unification rule. The embodiment further includes computer usable code for selecting, responsive to the character variant not satisfying the unification rule, a different variation of the character from the unification repository, the different variation forming a replacement character variant. The embodiment further includes computer usable code for using the replacement character variant in place of the character variant.

Another embodiment includes a data processing system for configurable character variant unification. The embodiment further includes a storage device including a storage medium, wherein the storage device stores computer usable program code. The embodiment further includes a processor, wherein the processor executes the computer usable program code. The embodiment further includes computer usable code for determining that a unification profile is applicable to a circumstance in which a character variant has been selected, wherein the character variant is a variation of a character in a set of variations of the character such that each variation of the character in the set is represented by a unique Unicode code point. The embodiment further includes computer usable code for identifying a unification repository according to the profile. The embodiment further includes computer usable code for determining whether the character variant satisfies a unification rule. The embodiment further includes computer usable code for selecting, responsive to the character variant not satisfying the unification rule, a different variation of the character from the unification repository, the different variation forming a replacement character variant. The embodiment further includes computer usable code for using the replacement character variant in place of the character variant.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 6 depicts a flowchart of an example process for configuring character variant unification in accordance with an illustrative embodiment.

DETAILED DESCRIPTION

Figure 1:
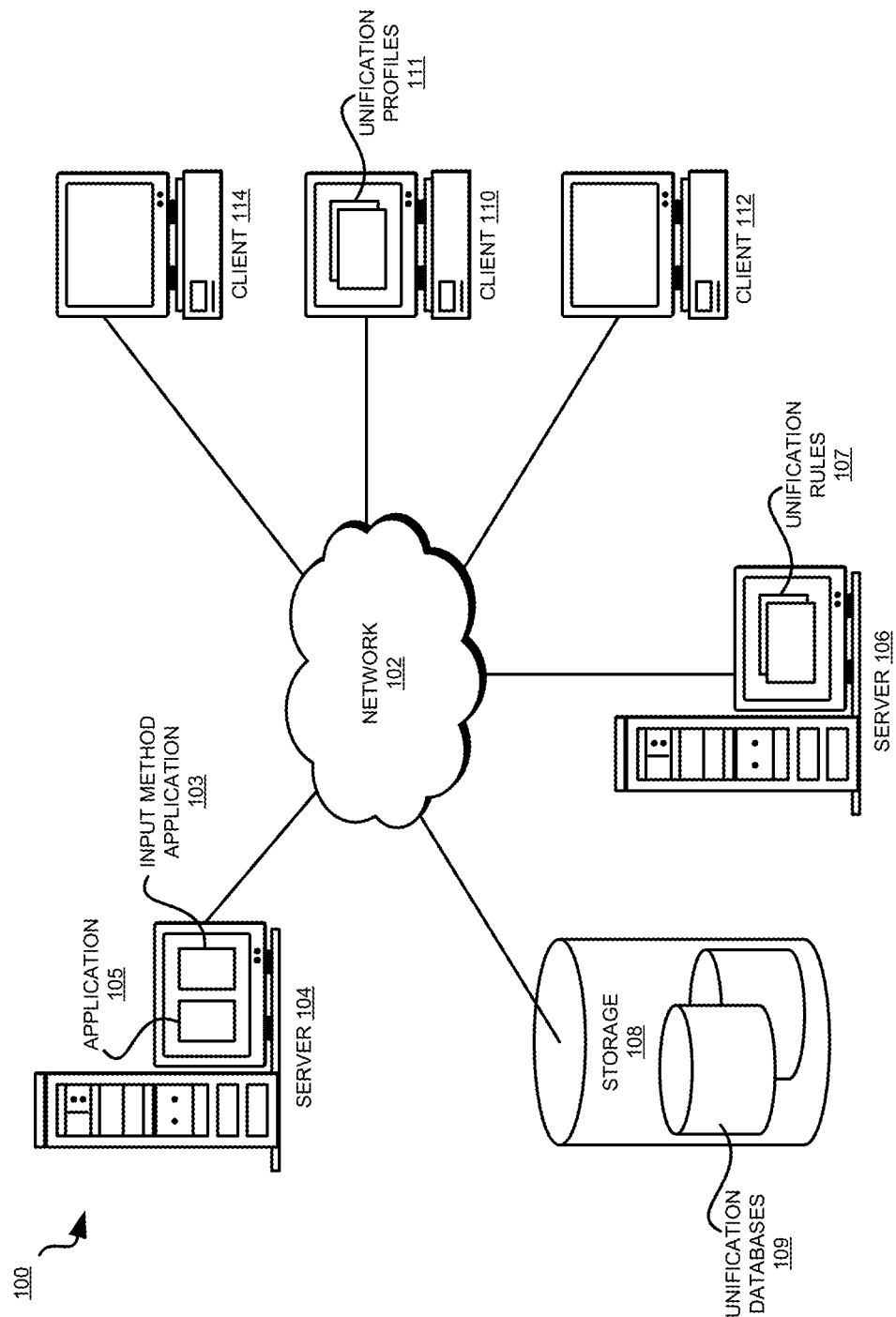
FIG. 1 depicts a block diagram of a network of data processing systems in which illustrative embodiments may be implemented.

A character variant is a variation of a character within a language or across different languages. For example, a first type of character variants involves different characters in a given language or across different languages, where the different characters look different but are pronounced in a similar manner, convey similar meanings, or both. This type of variants is referred to hereinafter as 'distinct variants'. For example, in the Chinese language, this type of character variants can be found between simplified Chinese and traditional Chinese. The simplified character is visually different from the traditional character, but the simplified and the traditional characters are pronounced approximately the same and convey approximately the same meanings.

A second type of character variants is called 'resemblance variants'. Resemblance variants are different characters in a given language or across different languages, where the different characters look similar, but may be pronounced in a similar manner or different manners, may convey similar meanings or different meanings, or some combination thereof. Often, resemblance variants have their origin in a character in one language, e.g., Chinese, where the character was adopted by other languages, e.g., Japanese or Korean, and gradually became a part of those languages without a change of the written expression of the character.

As a result, the original character and their resemblance variants were all added in the Unicode tables that contain characters from different languages, each character and its resemblance variants having a distinct code point and being treated as a unique character by computers although they visually look alike. A user can generally input all the character variants by using a UIM or other input methods.

The illustrative embodiments recognize a particular problem with resemblance variants. For example, if a user searches for a character, and if the character has resemblance variants, the user is presented with the resemblance variants. For example, if the user is searching for character 302 in FIG. 3, the user may be presented with characters 302, 304, and 306, where characters 304, and 306 are resemblance variants of a common character, e.g., of character 302.

The illustrative embodiments recognize that when faced with resemblance variants, a user may unintentionally, unknowingly, or even maliciously select a different resemblance variant than the variant that was intended. The illustrative embodiments recognize that selecting or entering a different resemblance variant of a character than an intended resemblance variant of the character can pose a variety of problems in data management.

For example, a particular variant may not be allowed in information processing in certain languages or certain regions. Entering a prohibited variant can therefore cause errors, costs, and delays in processing of the information in which the prohibited variant is included.

As another example, a user may be looking for the character to enter as a user ID, password, filename, or other phrases during the information processing. Selecting the incorrect variant can cause login error, login lockout, security flagging, existing file not being found, new file being created with a name that will not be found by others, and generally data being created or manipulated in an inconsistent or erroneous fashion.

As another example, suppose the user is engaged in a record manipulation operation in a database. Using wrong, inconsistent, or different variants can result in ghost records being created in the database. Using wrong, inconsistent, or different variants can also increase the data processing time and resource usage due to the extra effort needed to process the different variants, e.g., by employing different language processing tools for processing the variants.

The illustrative embodiments further recognize that not only do resemblance variants have the potential to cause data processing complications, they also have the potential to cause social and cross-cultural issues and insensitivities. Thus, the illustrative embodiments recognize that unintended, accidental, or malicious misuse of resemblance variants can adversely affect the quality of data where used, and also have social, geographical, political, and economic consequences.

The illustrative embodiments used to describe the invention generally address and solve the above-described problems and other problems related to using character variants. The illustrative embodiments provide a method for configurable character variant unification.

Unification is the process of unifying one or more character variants back to a common character. A unification database (database, databases) according to an embodiment is a repository of variants that can be unified to a character in a given language. For example, a unification database for simplified Chinese language includes a list of characters, their corresponding code points in simplified Chinese, and their respective distinct variants, resemblance variants, or both. Any number of unification databases can be created for any number of languages without limitation within the scope of the illustrative embodiments.

Furthermore, more than one unification databases may exist for a given language. A custom unification database that includes entries for characters in multiple languages and their variants from a combination of languages is also contemplated within the scope of the illustrative embodiments. The unification database can take any suitable form, including but not limited to a relational database, a flat-file, an XML file, an index file, a spreadsheet, a table, and the like.

A unification rule (rule, rules) is logic in any suitable form to resolve a variant to an intended character or a different variant using one or more unification databases. For example, given a character variant selected by a user, an embodiment uses a unification rule to select a suitable changed variant of the character from a unification database.

Any number of unification rules is permissible without departing the scope of the illustrative embodiments. A set of unification rules according to the illustrative embodiments can include unification rules for any combination of different languages, different geographical regions, different locales, and different contexts of usage. Furthermore, different unification rules may produce different changed variants depending on various considerations. For example, if the user selects a variant at login time, for use in a user ID, an embodiment uses a different unification rule according to the login context as compared to the unification rule used when the user selects a variant to embed in a document. The different unification rules may use the same or different one or more unification databases, and produce same or different changed variants under the different contexts.

A unification profile (profile, profiles) comprises one or more unification levels (level, levels). A unification level defines how and which unification databases are to be combined for a particular unification exercise. A unification profile applies to a user, a group of users, a document, an application, a data storage, a locale, a geographical region, or some combination thereof.

For example, a user can define four example levels—Simplified Chinese only (level 1); Traditional Chinese only (level 2); Simplified Chinese and Traditional Chinese (level 3); and Simplified Chinese, Traditional Chinese, and Japanese Kanji (level 4). The user can further define, for example, that different levels apply to different users, groups, applications, or storage, in a manner that further narrow or define the application of the profile.

For example, a profile might apply to a group and a level therein might apply to a specific user in that group. As another example, a profile might apply to a geographical region and a level therein might apply to a specific group operating in that region. These example ways of constructing profiles and levels, and example applications of the profiles and levels are not intended to be limiting on the illustrative embodiments. From this disclosure, those of ordinary skill in the art will be able to conceive many other ways of constructing and using profiles and levels, and the same are contemplated within the scope of the illustrative embodiments.

In operation, when a user is going to be using character variants, an embodiment selects a profile and a level in the profile according to which the embodiment will unify the variants to produce an output variant for the user-select variant. In one embodiment, the user selects the profile and the level. In another embodiment, the profile and level are selected on behalf of the user, such as by an administrator. In another embodiment, a policy determines the profile and level that the embodiment should use.

Once the profile and the level are selected, an embodiment performs the variant unification on a character variant selected by the user to produce an output character variant. The embodiment uses the one or more unification database(s) corresponding to the selected profile and level, according to one or more unification rules governing the circumstances of the selection of the character variant by the user.

An embodiment allows a user, an administrator, or both to create, modify, or manipulate a unification profile, a unification level within a unification profile, a unification rule, a unification database, or some combination thereof. For example, one embodiment allows a user, whose variant selections are to be unified, to manipulate a level but not the profile itself, and allows an administrator to manipulate the profile. Another example embodiment allows the user create or manipulate entries in a unification database but only allows an administrator to manipulate unification rules. Another example embodiment allows different users to manipulate different profiles, levels, rules, databases, or a combination thereof.

A method of an embodiment described herein, when implemented to execute on a data processing system, comprises substantial advancement of the functionality of that data processing system. For example, an embodiment enables the data processing system to identify and unify particular variants that may not be allowed in information processing in certain languages or certain regions, prior to such variants entering such information processing. Such identification and unification ability is unavailable in presently operating data processing systems. Thus, a substantial advancement of such data processing systems by executing a method of an embodiment comprises the prevention or mitigation of the errors, costs, and delays in processing of the information caused by the prior art data processing systems allowing the entry and storing of undesirable character variants.

The illustrative embodiments are described with respect to certain languages, characters, character variants, documents, identifiers, contexts, profiles, levels, databases, repositories, policies, logic, rules, data processing systems, environments, components, and applications only as examples. Any specific manifestations of such artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
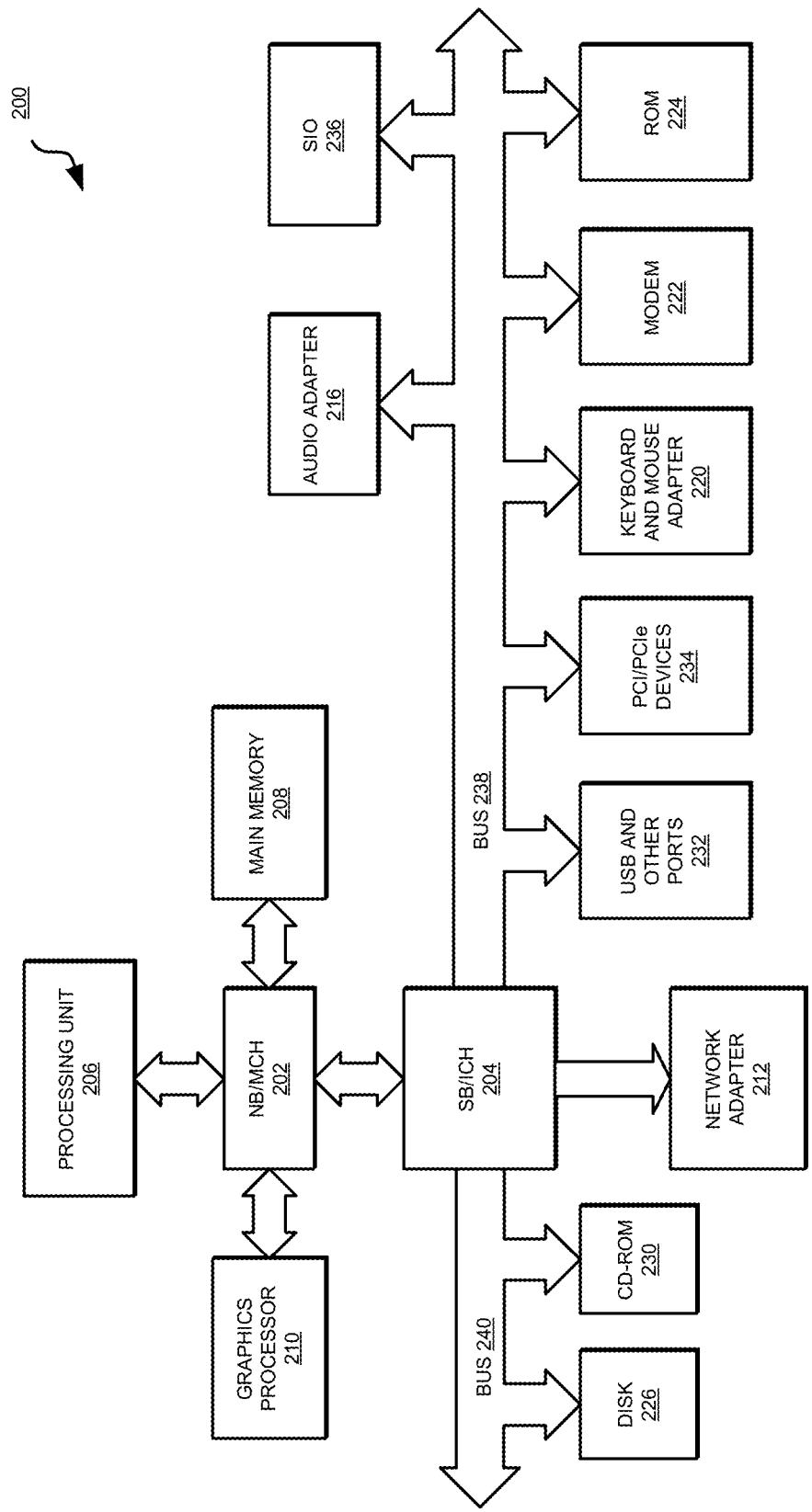
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments.

Input method application 103 is any suitable UIM as described herein. Application 105 implements an embodiment described herein. Unification rules 107 are a set of one or more unification rules usable in an embodiment. Unification databases 109 are a set of one or more unification repositories of any suitable types as described herein. Unification profiles 111 are a set of one or more unification profiles usable in an embodiment.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments. Data processing system 200 is also representative of other devices in which computer usable program code or instructions implementing the processes of the illustrative embodiments may be located. Data processing system 200 is described as a computer only as an example, without being limited thereto. Implementations in the form of other devices may modify data processing system 200 and even eliminate certain depicted components there from without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as input method application 103, application 105, and unification rules 107 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
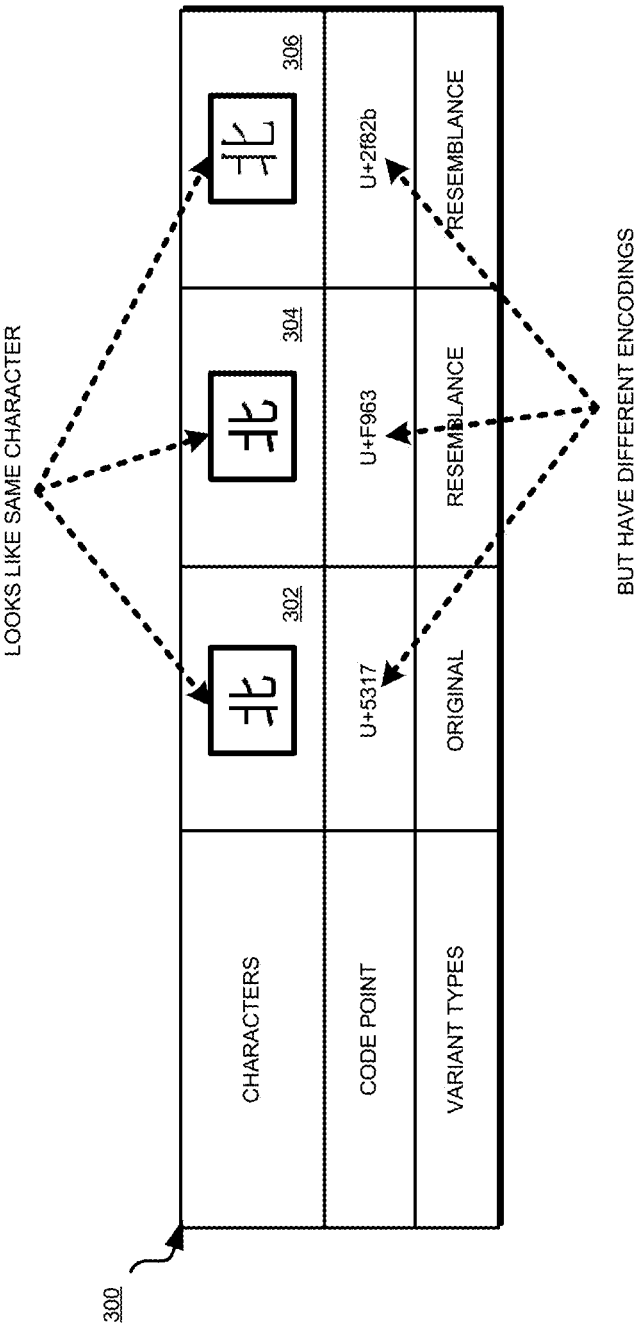
FIG. 3 depicts a table of example resemblance variants of an example character that can be configurably unified in accordance with an illustrative embodiment.

With reference to FIG. 3, this figure depicts a table of example resemblance variants of an example character that can be configurably unified in accordance with an illustrative embodiment. Application 105 in FIG. 1 can be used to unify variants 302, 304, and 306 into the variant 302.

Table 300 shows that Han character 302 is an original variant that corresponds to Unicode code point U+5317, and has at least two other resemblance variants 304 and 306, which correspond to code points U+F963 and U+2f82b, respectively. For example, if a user uses a PINYIN, a commonly used Chinese phonetic input method editor, and enters "bei" using a keyboard, the user is likely to be presented with all three variants from which the user selects one variant to use.

Suppose a given usage context or circumstance requires Han characters but the user selects variant 304 corresponding to code point U+F963, thereby selecting a Chinese-Japanese-Korean (CJK) compatibility ideograph instead. Such a selection would ordinarily cause an error or other complication in the processing of the data including the selected variant. If character variant unification feature is enabled, such as by using an application implementing an embodiment, e.g., application 105 in FIG. 1, the unification feature unifies selected variant 304 to produce variant 302 as the output.

An entry in a unification database in databases 109 of FIG. 1 establishes the correspondence between variants 302, 304, and 306. A unification rule in rules 107 of FIG. 1 allows the application to determine that under the circumstances of the selection, variant 304 should be changed to variant 302. Only as an example to illustrate the operation of unification rules, and not to imply any limitation on the illustrative embodiments, another unification rule in rules 107 of FIG. 1 may allow the application to determine that under different circumstances of the selection, variant 304 should be changed to variant 306, or variant 304 should be accepted as the correct variant.

Figure 4:
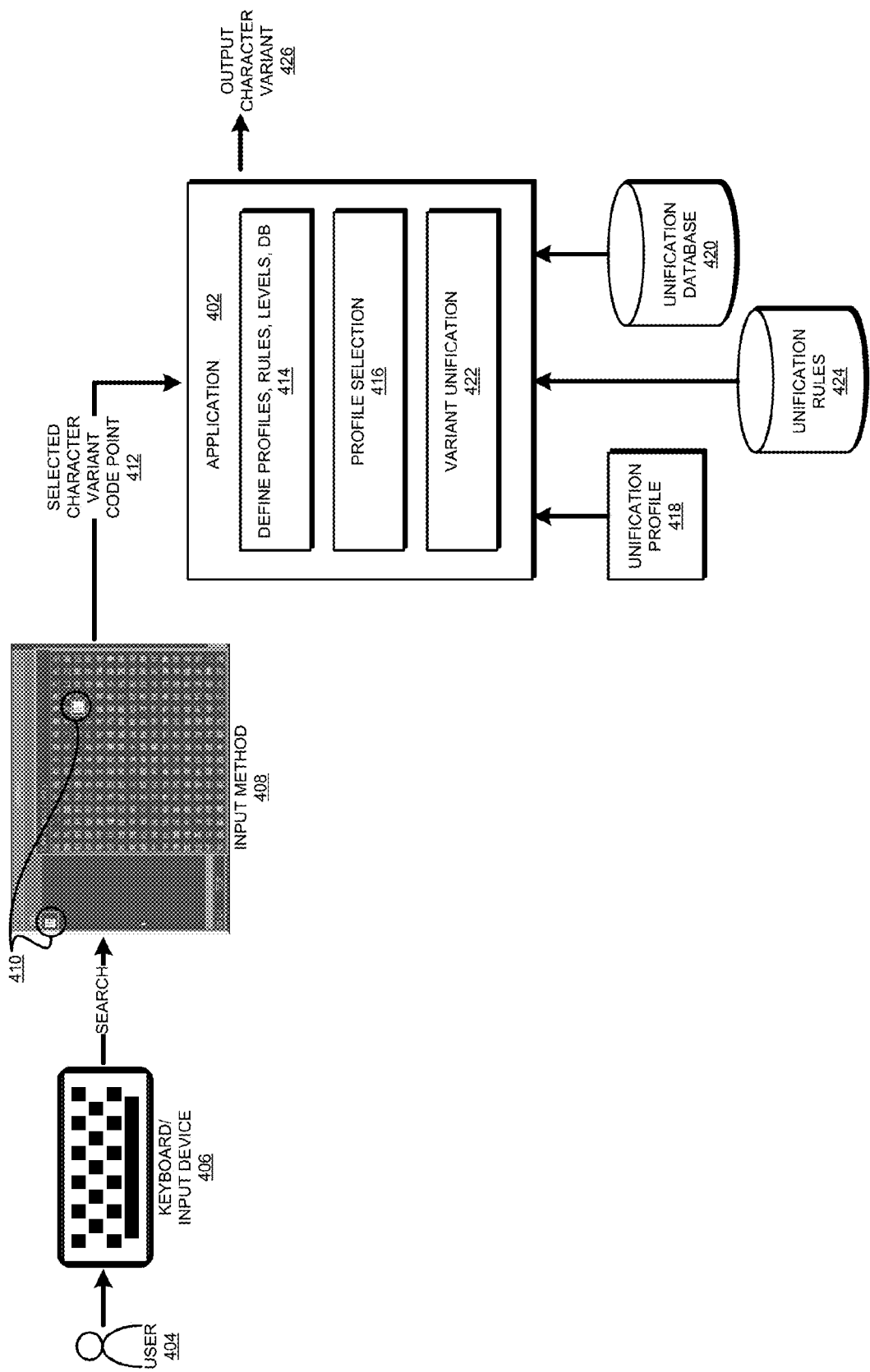
FIG. 4 depicts a block diagram of a configuration for configurable character variant unification in accordance with an illustrative embodiment.

With reference to FIG. 4, this figure depicts a block diagram of a configuration for configurable character variant unification in accordance with an illustrative embodiment. Application 402 can be implemented using application 105 in FIG. 1.

User 404 uses input device 406 to enter a search for a character. UIM 408 presents a set of characters from which the user selects character 410. UIM 408 produces code point 412 of selected character 410. Code point 412 serves as an input to application 402.

Component 414 allows a user or administrator to define one or more unification profiles, one or more unification levels within a unification profile, one or more unification rules, one or more unification databases, or a combination thereof. Component 416 selects a unification profile, e.g., unification profile 418 and a level therein, and one or more unification databases according to profile 418, e.g., unification database 420.

Component 422 applies one or more unification rules 424 to code point 412 according to the selected level in profile 418. Component 412 produces output character variant 426, or a Unicode code point corresponding thereto.

Figure 5:
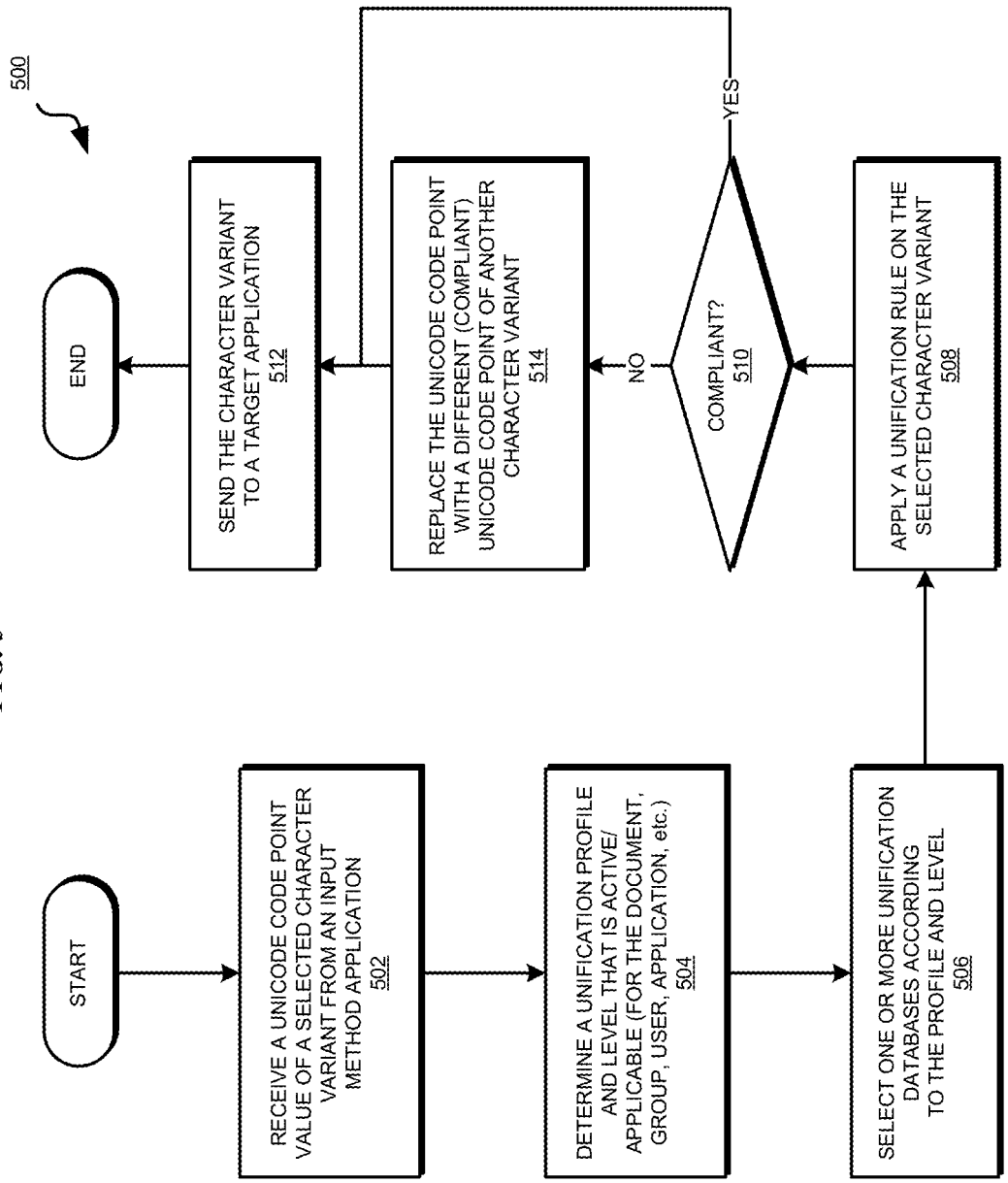
FIG. 5 depicts a flowchart of an example process for configurable character variant unification in accordance with an illustrative embodiment.

With reference to FIG. 5, this figure depicts a flowchart of an example process for configurable character variant unification in accordance with an illustrative embodiment. Process 500 can be implemented in application 402 in FIG. 4.

The application receives a Unicode code point value of a selected character variant from a UIM (block 502). The application determines a unification profile that is active or applicable for unifying the selected character variant and a unification level in that profile (block 504).

For example, according to one embodiment, the profile and level are selected by a user or administrator and the application uses the selected profile and level in block 504. According to another embodiment, the application determines a circumstance of the selected character variant, e.g., the user's identification, the user's membership in a group, the document where the selected character variant is going to be used, a context in which the variant has been selected, an application that is to receive the character from the user, other circumstances, or a combination thereof. Based on the circumstance of usage, the application selects a suitable profile and a level therein for use in block 504.

The application selects one or more unification databases according to the selected profile and level (block 506). The application applies one or more unification rules on the selected character variant using the selected unification databases of block 506 (block 508).

From applying a unification rule, the application determines whether the selected character variant complies with the rule (block 510). If the selected character variant is the correct variant (Yes" path of block 510), the application sends the selected character variant to the target application that was to receive the character (block 512). The application ends process 500 thereafter.

If the selected character variant is the correct variant (Yes" path of block 510), the application replaces the Unicode code point received in block 502 with a Unicode code point of another character variant identified in a unification database according to a unification rule (block 514). The application sends the replaced character variant to the target application in block 514 and ends process 500 thereafter.

With reference to FIG. 6, this figure depicts a flowchart of an example process for configuring character variant unification in accordance with an illustrative embodiment. Process 600 can be implemented in application 402 in FIG. 4.

The application causes to be created, or creates, a unification profile that is applicable to a circumstance in which a character variant might be selected (block 602). The application causes to be defined, or defines, a unification level in the unification profile of block 602 (block 604).

For a level in the profile, the application associates one or more unification databases with the profile level (block 606). The application enables the profile and/or level to be used with a set of unification rules (block 608). For example, an administrator may desire to create some profiles and/or levels in reserve without enabling them for use. Similarly, an administrator may enable or disable a profile or a level within the profile according to changing needs for character variant unification.

The application repeats blocks 604-608 for as many levels as may be desired in a profile. The application repeats blocks 602-608 for as many profiles with as many levels as may be desired in a given implementation. The application ends process 600 thereafter.

Thus, a computer implemented method is provided in the illustrative embodiments for configurable character variant unification.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for configurable character variant unification, the method comprising:

determining that a unification profile is applicable to a circumstance in which a character variant has been selected, wherein the unification profile is configured in the form of a plurality of levels, wherein the unification profile applies to the circumstance, and wherein each level in the plurality of levels applies to a different sub-circumstance within the circumstance wherein each different sub-circumstance narrows the applicability of the unification profile, wherein the character variant is a variation of a character in a set of variations of the character such that each variation of the character in the set is represented by a unique Unicode code point;

identifying a unification repository from a set of unification repository according to the unification profile and a selected level that is applicable to a particular sub-circumstance, each unification repository in the set of unification repositories including a different set of variants, wherein the unification profile comprises information to combine a subset of unification repositories from the set of unification repository;

determining whether the character variant satisfies a unification rule;

selecting, responsive to the character variant not satisfying the unification rule, a different variation of the character from the unification repository, the different variation forming a replacement character variant; and using the replacement character variant in place of the character variant.

2. The method of claim 1, further comprising:

receiving a Unicode code point of the character variant; and outputting a different Unicode code point corresponding to the replacement character variant.

3. The method of claim 1, wherein the unification profile applies to a document, and wherein the unification repository is selected according to the selected level in the unification profile.

4. The method of claim 1, wherein a user selects the character variant, and the circumstance comprising a membership of the user in a group, and a sub-circumstance corresponding to the selected level comprising a specific user in the group.

5. The method of claim 1, the circumstance comprising a geographical region related to a user who selects the character variant, and a sub-circumstance corresponding to the selected level comprising a specific group operating in the geographical region.

6. The method of claim 1, wherein the profile cannot be manipulated by a user who selects the character variant but the user can manipulate the selected level.

7. The method of claim 1, the circumstance comprising: a locale related to a user who selects the character variant.

8. The method of claim 1, the circumstance comprising: a geographical region related to a document in which the selected character variant is to be used.

9. The method of claim 1, the circumstance comprising: a language related to a document in which the selected character variant is to be used.

10. The method of claim 1, the circumstance comprising: a locale related to a document in which the selected character variant is to be used.

11. The method of claim 1, the circumstance comprising:
a context in which the character variant is selected, the context comprising an intended purpose for selecting the character variant.

12. The method of claim 1, wherein the unification profile applies to an application, and wherein the unification repository is selected according to the selected level in the unification profile.

13. The method of claim 1, wherein the unification profile applies to a data storage, and wherein the unification repository is selected according to the selected level in the unification profile.

14. The method of claim 1, wherein the unification profile applies to a locale, and wherein the unification repository is selected according to the selected level in the unification profile.

15. The method of claim 1, wherein the unification profile applies to a geographical region, and wherein the unification repository is selected according to the selected level in the unification profile.

\* \* \* \* \*